United States Patent Office 3,679,419
Patented July 25, 1972

3,679,419

LIGHT-SENSITIVE DIAZO CONDENSATE CONTAINING REPRODUCTION MATERIAL

Thomas N. Gillich, Berkeley Heights, N.J., assignor to Azoplate Corporation, Murray Hill, N.J.

No Drawing. Filed May 20, 1969, Ser. No. 826,289
Int. Cl. G07c *113/04;* G03c *1/54;* G03f *7/08*
U.S. Cl. 96—91 R 4 Claims

ABSTRACT OF THE DISCLOSURE

This invention relates to novel light-sensitive reproduction material, a process for the preparation of novel light-sensitive condensation products, and to said condensation products as compounds, the compounds being condensation products of at least one diazonium salt of the general formula

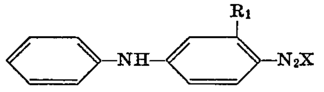

wherein $R_1$ is selected from the group consisting of H, an alkoxy group having from 1 to 4 carbon atoms, and a 2-hydroxy-ethoxy group, and
X is the anion of the diazonium salt, and at least one compound of the general formula $$R(—CH_2—OR_2)_n$$

wherein

*n* is an integer from 1 to 4,
R is a residue produced by the splitting off of *n* hydrogen atoms from a diphenyl ether, and
$R_2$ is selected from the group consisting of H, an alkyl group with 1 to 4 carbon atoms, and an acyl group with 1 to 4 carbon atoms, said condensation product containing, on the average, 0.25 to 0.75 unit derived from $R(—CH_2—OR_2)_n$ per diazo group.

This invention relates to light-sensitive reproduction material, which latter comprises a support having a reproduction layer thereon containing at least one light-sensitive condensation product of an aromatic diazonium salt, a new process for the preparation of the light-sensitive condensation products, and to the condensation products prepared according to the new process.

It is known to use light-sensitive aromatic diazonium compounds for sensitizing reproduction materials which are useful for the production of single copies or printing plates.

High molecular weight diazonium salts with several diazonium groups in the molecule have been advantageously employed, particularly in the production of tanned images or planographic printing form, the reproduction layer of which is to be rendered insoluble or oleophilic by the action of light. These diazonium compounds usually have a resinous character and are obtained, for example, by the introduction of diazonium groups into phenol-formaldehyde condensation resins either by nitration, reduction, and diazotization or by other known reactions. The diazo resins thus obtained have certain disadvantages, however, e.g. a very limited storability, and therefore have not become of practical importance.

Polyfunctional diazonuim salts have been obtained in another way, i.e., certain aromatic diazonium salts have been condensed in an acid condensation medium with active carbonyl compounds, particularly formaldehyde. This type of high molecular weight diazonium compound is used on a large scale in the production of reproduction materals, particularly in the production of printing forms. Of these compounds which are described, for example, in U.S. Pats. Nos. 2,063,631 and 2,667,415, particularly the condensation products of diphenylamine diazonium salts with formaldehyde have become a great technical importance.

The preparation of such and similar diazo resins is further described in U.S. Pats. Nos. 2,679,498; 3,050,502; 3,311,605; 3,163,633; 3,406,159, and 3,277,074.

The production of tanned images by combining such diazo resins with hydrophilic colloids and, if desired, dyestuffs or pigments, in reproduction layers is described, for example, in U.S. Pats. No. 2,100,063; 2,687,958, and 3,010,389.

By far the greatest importance, however, of this class of diazo resins is in reproduction materials for the photomechanical production of planographic and offset printing forms. The diazo resins may be employed in the reproduction layers of these materials without further additives or, for example, in combination with water-soluble colloids or with water-insoluble polymers which are not light-sensitive. Exemplary of suitable supports for such reproduction layers are water-resistant papers with suitable lithographic surfaces, i.e., superficially saponified cellulose acetate, metal supports such as aluminum, zinc, copper, brass, chromium, niobium, and tantalum; multimetal supports; lithographic stone; and the like. Metal supports are preferable for long printing runs and aluminum is usually employed. The use of metal as a supporting material for reproduction layers containing the listed diazo resins has the disadvantage, inter alia, that the adhesion of the exposure products of the diazo resins on the metal supports usually is not very good and, furthermore, that the metal may have a decomposing effect on the diazo resin.

A number of suggestions have been made for avoiding these difficulties, e.g. to pretreat the metal surface with silicates (U.S. Pat. No. 2,714,066) with organic polyacids (U.S. Pat. No. 3,136,636), with phosphonic acids and their derivatives (U.S. Pat. No. 3,220,832), with potassium hexafluorozirconate (U.S. Pat. No. 2,946,683), furthermore to use diazo resins prepared in phosphoric acid (U.S. Pat. No. 3,235,384), to add phosphoric acid to the diazo resins and to use them in a metal salt-free state (U.S. Pat. No. 3,236,646), to use anodized aluminum surfaces, and the like.

Despite finding wide technical use, the known diazo resins have other disadvantages. With the low molecular weight condensates which are advantageously employed, with respect to storability, only unsatisfactory ink acceptance of the exposure products is achieved on non-metallic supports into which the mass can easily penetrate, e.g. on superficially saponified cellulose acetate film.

Another drawback of the known diazo resins lies in that their usually employed double salts with zinc chloride, and particularly the metal salt-free products containing phosphoric acid or other acids, yield reproduction layers having a high sensitivity to moisture and thus to fingerprints. In the case of careless handling, the reproduction layer may be easily damaged.

For overcoming this drawback it has been suggested in U.S. Pat. No. 3,300,309, for example, to react the diazo resins with certain phenolic coupling components to obtain addition products sparingly soluble in water and yielding reproduction layers which are less sensitive to moisture. These addition products, which contain relatively loose bonds of the nature of a salt or complex, can be easily decomposed again, e.g. by organic solvents, and their stability thus is not sufficient under all conditions.

Furthermore, the light-sensitivity is not satisfactory, particularly in the case of the known diazo resins which have excellent thermostability, e.g. condensation products of 3-alkoxy-4-diazo-diphenylamine with formaldehyde.

A common disadvantage of the diazo resins hitherto preferably technically employed, furthermore resides in the fact they can be separated only with difficulty in a metal salt-free form, e.g. as chlorides, sulfates, or as salts of simple organic sulfonic acids, and their salts are often only insufficiently soluble in organic solvents.

The drawbacks of the prior art can be overcome, or at least considerably reduced, by using new diazo condensation products instead of the diazonium salts hitherto employed for the above applications.

In co-pending application Ser. No. 826,297 filed May 20, 1969 there are described and claimed novel light-sensitive compounds and a light-sensitive reproduction material which comprises a support having a reproduction layer thereon, the latter containing at least one of the novel compounds which are light-sensitive condensation products of aromatic diazonium compounds which condensation products include at least one unit each of the general types:

$$A(—D)_n \text{ and } B$$

which are connected by a bivalent intermediate member derived from a condensable carbonyl compound and wherein A is a radical of a compound containing at least two aromatic carbocyclic and/or aromatic heterocyclic nuclei, which compound is capable of condensation in at least one position with an active carbonyl compound in an acid medium, D is a diazonium salt group attached to an aromatic carbon atom of A,

*n* is an integer from 1 to 10, and

B is a radical of a compound free of diazonium groups, which compound is capable of condensation in at least one position with an active carbonyl compound in an acid medium, the condensation product containing, on the average, about 0.01 to 50 B units per unit of $A(—D)_n$.

Co-pending application Ser. No. 826,296, filed May 20, 1969 relates to a process for the preparation of light-sensitive aromatic diazo condensation products of the above-indicated general type, to the compounds obtained according to the new process and the use of the compounds in light-sensitive reproduction material which process comprises reacting at least one $A(—D)_n$ compound and at least one $B_1$ compound of the general formula $E(—CHR_a—OR_b)_m$ in a strongly acid medium, wherein A is a radical of a compound containing at least two members selected from the group consisting of an aromatic ring and a heterocyclic ring of aromatic nature, D is a diazonium salt group linked to an aromatic carbon atom of A,

*n* is an integer from 1 to 10,

E is a residue obtained by the splitting-off of *m* H atoms from a compound free of diazonium groups and being capable of condensation in at least one position with an active carbonyl compound in an acid medium.

$R_a$ is selected from the group consisting of hydrogen, alkyl, aryl, and heterocyclic groups, $R_b$ is selected from the group consisting of hydrogen, alkyl or acyl groups having 1 to 4 carbon atoms, and a phenyl group, and

*m* is an integer from 1 to 10, the condensation product containing about 0.01 to 50 units derived from $B_1$ per unit of $A(—D)_n$.

The present invention relates to light-sensitive reproduction material comprising a support and a reproduction layer which contains, as the light-sensitive substance, a condensation product of at least one diazonium salt of the general formula

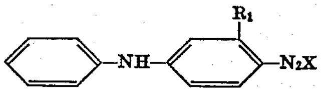

wherein $R_1$ is H, an alkoxy group with 1 to 4 carbon atoms or a 2-hydroxy-ethoxy group, and X is the anion of the diazonium salt, and at least one compound of the general formula $$R(—CH_2—OR_2)_n$$

wherein

*n* is an integer from 1 to 4,

R is a radical obtained by the splitting-off of *n* hydrogen atoms from a diphenyl ether, and $R_2$ is H, and alkyl group with 1 to 4 carbon atoms, or an acyl group with 1 to 4 carbon atoms, the condensation product containing, on the average, 0.25 to 0.75 unit derived from $R(—CH_2—OR_2)_n$ per diazo group.

The new mixed condensates used in the reproduction materials of the invention are prepared by condensing, in a strongly acid medium, a diazonium salt of the above general formula with a diphenyl ether derivative of the above formula in a quantitative ratio such that about one $—CH_2—OR_2$ group, but at the most 1.2 of such groups, are present per each diazonium salt group.

When the diphenyl ether derivative is employed as a pure compound or as an isomer mixture with a uniform *n* value, this value should be at least 2 in order to obtain the above molar ratio in the condensate. Diphenyl ether derivatives of the above formula with $n=1$, however, may be employed in admixture with compounds having higher *n* values. Especially easily reproducible results are obtained by employing diphenylether derivatives for condensation which contain a $—CH_2—OR_2$ group in each nucleus, particularly in the 4,4′-positions.

The diphenyl ether compound of which R is a radical may be the unsubstituted diphenyl ether or a diphenyl ether substituted by one or more halogen atoms, alkyl, alkoxy, or alkylmercapto groups containing 1 to 4 carbon atoms. In the case of more than one substituent these may be similar or different, however, in general there are not more than three of these substituents present in one molecule. The unsubstituted diphenyl ether is generally preferred as the basic compound from which the compound $R(—CH_2—OR_2)_n$ is derived.

In addition to their limited ratio of condensation, the mixed condensates used in the reproduction materials of the present application are distinguished from those of co-pending application Ser. No. 826,296 by the fact that their mean molecular weights are normally lower. Their average molecular weight is generally in the range of about 500 to 2000. Due to their low molecular weights, the condensates are normally more readily soluble so that they can more easily be processed to reproduction layers. Further, the reproduction materials prepared therewith show a particularly favorable combination of light-sensitivity and storability. Although it is in principle possible to prepare low molecular weight condensation products using other condensation conditions, it is particularly easy to achieve reproducible mean molecular weights within the desired range by condensing the specific components mentioned above under the conditions of condensation described above.

As compared to reproduction material sensitized with known low molecular weight home-condensates of light-sensitive diazonium compounds, the materials according to the present invention display a considerably higher light-sensitivity, good developing characteristics in combination with a satisfactory storability.

The reproduction materials according to the present invention are preferably used for the photomechanical preparation of planographic printing plates in which the oleophilic light-decomposition product acts as a conveyor of the greasy printing ink.

The preferred support is aluminum the surface of which may be mechanically or chemically roughened and which has advantageously been subjected to any of the known methods of chemical surface treatment, e.g. with organic polyacids, silicates, etc., as mentioned above.

Other supports may also be used, provided they have a hydrophilic lithographic surface.

Superficially saponified cellulose acetate film and water-resistant paper and film supports having a lithographic surface also may be used.

Further, the reproduction layers may be converted into etching resists after image-wise exposure. Multi-metal printing forms can also be produced using the novel reproduction layers. Furthermore, the reproduction layers according to the invention may be used in combination with known etching processes for the preparation of relief and intaglio printing forms from relatively thick metal sheets, e.g. zinc plates.

Alternatively, the reproduction materials according to the present invention may be used for the preparation of tanned images or single copies.

For the preparation of the diazo condensates to be used according to the invention, the diphenyl diazonium salt is normally dissolved in the acid serving as the condensation medium, and the diphenyl ether derivative capable of condensation is then added either as such or dissolved in a suitable solvent, e.g. glacial acetic acid, methanol or formic acid, and the mixture is then condensed for several hours at temperatures up to 70° C., preferably between +10° C. and +40° C.

Strong acids in high concentrations, i.e. at least 50 percent, e.g. phosphoric acid, methane sulfonic acid and sulfuric acid, are used as condensation media. The use of 80–100% phosphoric acid is particularly advantageous. The quantity of condensation medium to be used per part by weight of mixture of diphenyl ether derivative and diphenylamine-4-diazonium salt will normally range from 1 to 100 parts by weight. Sufficient acid must be used to enable the mixture obtained to be easily stirred.

The diphenylamine-4-diazonium salts used for the condensation are preferably employed in the form of their sulfuric acid or phosphoric acid salts. Other salts, e.g. chlorides, may also be used. In some cases, the novel condensation products may be employed in the form of the crude condensates, i.e. without previous separation of the condensation medium and possible uncondensed diazo compound. This is possible mainly in those cases where a low quantity of condensation medium can be employed per mole of diazo compound.

Generally, the new condensation products are separated in the form of any salt and in this form, after the addition of any desired additional layer constituents, are used for the production of the reproduction material.

The diazo condensation products may be separated as salts of the following acids and then be employed: hydrohalogenic acids, such as hydrofluoric acid, hydrochloric acid, and hydrobromic acid; sulfuric acid; nitric acid; phosphoric acids (5-valent phosphorus), particularly orthophosphoric acid; inorganic iso- and hetero-polyacids, e.g. phosphotungstic acid, phosphomolybdic acid; aliphatic or aromatic phosphonic acids or their semiesters; arsonic acids; phosphinic acids; trifluoroacetic acid; amidosulfonic acid; selenic acid; fluoboric acid; hexafluorophosphoric acid, and perchloric acid; furthermore aliphatic and aromatic sulfonic acids, e.g.

methanesulfonic acid,
benzenesulfonic acid,
toluenesulfonic acid,
mesitylenesulfonic acid, p-chlorobenzenesulfonic acid,
2,5-dichlorobenzenesulfonic acid,
sulfosalicyclic acid,
naphthalene-1-sulfonic acid,
naphthalene-2-sulfonic acid,
2,6-di-tert.-butyl-naphthalenesulfonic acid,
2,6-di-tert.-butyl-naphthalenedisulfonic acid,
1,8-dinitro-naphthalene-3,6-disulfonic acid,
4,4′-diazidostilbene-3,3′-disulfonic acid,
2-diazo-1-naphthol-4-sulfonic acid,
2-diazo-1-naphthol-5-sulfonic acid,
1-diazo-2-naphthol-4-sulfonic acid, and the like. Other organic sulfonic acids suitable for the separation of the condensates are listed in columns 2 to 5 of U.S. Pat. No. 3,219,447.

The new diazo condensation products also can be separated in the form of the double salts with metal halides or -pseudo halides, e.g. of the metals zinc, cadmium, cobalt, tin, and iron, or as the reaction products with sodium tetraphenyl borate or with 2-nitro-indanedione-(1,3), and then be used in known manner.

By the action of sodium sulfite, sodium azide or amines, they also can be converted into the corresponding diazosulfonates, azides or diazoamino compounds and be employed in this form, as is known in the case of the diazo resins.

In addition to the advantages stated above, the reproduction materials according to the invention which employ superficially saponified cellulose acetate supports or other supports favoring the penetration of known diazo condensates into the support, are distinguished by a minor penetration of the diazo compound into the support.

In contradistinction to the known diazo resins, the new condensation products can be separated in many cases very easily from an aqueous solution by the addition of hydrochloric acid or common salt solution in the form of the chlorides or analogously as bromides. For this reason, a number of the new condensation products can be advantageously employed in those cases where the halides of the known diazo resins, which can be separated in a cumbersome manner only, have been preferably employed. Furthermore, the chlorides can be easily converted into the salts of acids of low volatility, e.g. into the orthophosphates, which, of course, also may be obtained directly, e.g. by condensation of the diazonium phosphates in phosphoric acid.

In the reproduction materials according to the invention, the novel condensation products may be combined either with water-soluble or with water-insoluble polymers. The preparation of reproduction layers containing water insoluble polymers is particularly simplified by the use of the novel condensation products, because these condensation products may be very easily obtained in the form of salts which are compatible with these polymers and which are readily soluble in various organic solvents.

For the preparation of the reproduction layers, an analogous procedure is used as in the case of the known diazo resins, i.e. the diazo condensates are dissolved, either alone or together with other layer components, in a suitable solvent and the solution thus produced is then applied to the selected support.

The coating may be applied, e.g., by immersion or casting and draining, or by casting and centrifuging off the excess of the solution, by brushing, by swabbing, or by roller-coating, or any other method of application. The coating thus applied is then dried at room temperature or at an elevated temperature.

Various substances may be added to the reproduction layers, such as, e.g.:

Acids, e.g. phosphoric acids (particularly those of the 5-valent phosporus, preferably orthophosphoric acid), phosphonic acids, phosphinic acids, and arsonic acids, furthermore the strong acids described in U.S. Pat. No. 3,235,382, such as sulfuric acid, hydrobromic acid, organic sulfonic acids, e.g. toluenesulfonic acid, methanesulfonic acid, and naphthalene-1,5-disulfonic acid, furthermore arsenic acid, and hexafluorophosphoric acid, furthermore the organic polyacids described in U.S. Pat. No. 3,179,518, e.g. polyacrylic acid, polyvinylphosphonic acid, polyvinylsulfonic acid, mellitic acid, and polyvinylhydrogenphthalate.

Water-soluble polymers, e.g. polyvinyl alcohol, polyethylene oxide, partially saponified polyvinyl acetate with an acetyl content up to about 40 percent, polyacrylamide, polydimethylacrylamide, polyvinylpyrrolidone, polyvinyl methyl formamide, polyvinyl methyl acetamide and copolymers of monomers forming these polymers or with monomers which alone form water-insoluble polymers, in such a quantity that the water-solubility of the copolymers is maintained, furthermore natural substances or modified natural substances, such as gelatine, methyl cellulose, carboxymethyl cellulose, hydroxyethyl celluose, alginates, and the like.

Polymers sparingly soluble or insoluble in water, e.g. phenol resins, epoxy resins, oil-modified alkyd resins, amineformaldehyde resins, such as urea and melamine resins, polyamides, polyurethanes, polyvinyl resins, polyacrylic and polymethacrylic acid esters, polyvinyl acetals, polyvinylchloride, polyesters, and polyethers, as obtained, for example, by the polymerization of vinyl ethers, of oxiranes, oxetanes or tetrahydrofuran. The polymers also may carry groups capable of enhancing solubility in alkali, e.g. carboxyl, carboxylic acid anhydride, sulfonic acid, sulfonic acid amide, and phosphonic acid groups, furthermore sulfuric acid semi-ester, phosphoric acid monoester and phosphonic acid monoester groups. The polymers may be incorporated into the reproduction layers either individually or, when they are compatible with one another, also in the form of mixtures.

Printing forms of substantially increased length of run are obtained from reproduction layers containing the mixed condensates in combination with polyvinyl formal resins, particularly on grained aluminum supports.

Colored or uncolored pigments.
Dyestuffs.
Plasticizers.
Wetting agents.
Sensitizers.
Indicators.
Fatty acids.

Aldehydes, particularly formaldehyde, also may be added to the reproduction layers.

All additives should be so selected, of course, that they are compatible with the diazo condensates and, furthermore, absorb light to as low a degree as possible in the wavelength range important for light-decomposition of the diazo compounds.

The additives generally may be incorporated into the reproduction layers in the following quantities: Acids: On metal supports and superficially saponified cellulose acetate films, acids of 5-valent phosphorus, particularly orthophosphoric acid, generally are employed in quantities of 0.01 to 4 moles, phosphonic and arsonic acids in quantities of 0.01 to 3 moles, per mole of diazo groups. On paper supports as described in U.S. Pat. No. 2,778,735, in addition to phosphoric acid, there also may be used strong acids, e.g. those described above, in quantities of 1 to 100 moles at the most per mole of diazo groups. In this connection, 1 mole means the quantity which contains 1 gram-atom P, As or an equivalent COOH.

The organic polyacids, insofar as they are readily water-soluble, generally are used in quantities of only 0.01 to 3 moles per mole of diazo groups.

The water-soluble polymers generally are used in quantities up to 100 parts by weight per part by weight of diazo compound, preferably not more than 20 parts by weight.

The addition of polymers insoluble in water generally will not exceed 20 parts by weight per part by weight of diazo compound; the preferred range is not more than about 10 parts by weight.

When the reproduction layers contain water-soluble and/or water-insoluble polymers, colored or uncolored pigments generally are added to them only in quantities not exceeding 50 percent by weight, calculated on the weight of the polymers.

Plasticizers, dyestuffs, wetting agents, sensitizers, indicators, and fatty acids generally are incorporated into the reproduction layers in quantities not exceeding 20 percent by weight, preferably not exceeding 10 percent by weight, calculated on the weight of the other layer constituents.

Reproduction layers containing or consisting of the new diazo condensates also may be combined with known light sensitive systems. This applies, for example, to the known diazo resins (formaldehyde condensates of the substituted or unsubstituted 4-diazo-diphenylamine), p-quinonediazides, iminoquinonediazides, azido compounds, photo-crosslinkable polymers with azido groups, chalcone groupings, cinnamic acid groupings, allyl ester and allyl ether groups, and to photopolymer layers.

Depending upon the layer constituents, suitable solvents for the preparation of the coating solutions are, for example, water, alcohols such as methanol, ethanol, and ethylene glycol monethyl ether, dimethyl formamide, diethyl formamide, and the like. Water, if desired with the addition of an organic solvent, is preferably employed in the case of metal halide double salts, sulfates, and phosphates of the new diazo condensates.

Pure organic solvents or those containing only a little water are preferred in the case of chlorides, bromides, and salts of the new diazo condensates, which are water-insoluble to a large extent, e.g. the salts of organic sulfonic acids, fluoboric acid, and hexafluorophosphoric acid. In these cases, to the alcohols or amides which normally are good solvents for these compounds, there are added solvents which dissolve them only sparingly, e.g. ethers such as dioxane, and tetrahydrofuran: esters such as acetic acid ethyl ester, butyl acetate, and ethylene glycol monomethyl ether acetate: ketones such as methyl ethyl ketone, cyclohexanone, and the like, in order to improve the levelling properties of the coating compositions.

The reproduction materials thus produced may be used directly after production, but there also may be days, weeks or months between production and processing. It is advantageous to store them at a cool, dry place.

The reproduction material is processed by image-wise exposure through an original. For image-wise exposure to light, any light source, conventional for reproduction purposes, may be used which emits in the long-wave ultra-violet range and in the short-wave visible range, e.g. carbon arc lamps, high-pressure mercury vapor lamps, xenon impulse lamps, and others.

After exposure to light, development is effected with a suitable developer. Suitable developers are, for example, water, mixtures of water with organic solvents, aqueous salt solutions, aqueous solutions of acids, e.g. of phosphoric acid, to which salts or organic solvents may be added, or alkaline developers, e.g. aqueous solutions of sodium salts of phosphoric acid or silicic acid. Also organic solvents may be added to these developers. In some cases, it is also possible to develop with undiluted organic solvents. The developers may contain additional constituents, e.g. wetting agents and hydrophilizing agents.

Development is performed in known manner, e.g. by immersing or wiping over or rinsing with the developer liquid.

The reproduction layers prepared with the new diazo condensation products yield negative copies of the originals employed in nearly all cases. Only when adding phenol resins to the reproduction layers, particularly in excess of the mixed condensate, positive copies of the original are obtained, however, with alkaline development.

Depending upon the composition of the layer, the supporting material, and processing, it is possible to produce with the new diazo condensates, for example, single copies, relief images, tanned images, printing forms for relief printing, intaglio printing, and planographic printing, or printed circuits.

In the following examples, preferred embodiments of the invention are described without limiting the scope of the invention thereby. Unless otherwise stated, percentages are by weight; parts by weight and parts by volume relate to each other as grams to milliliters. All temperatures are given in degrees centigrade.

EXAMPLE 1

0.3 part by weight of the naphthalene-2-sulfonate salt of the mixed condensate described below was dissolved in a mixture consisting of 80 parts by volume of ethyleneglycol monomethyl ether and 20 parts by volume of butyl acetate. The coating was applied to an aluminum sheet, the surface of which had been mechanically roughened and pretreated with an aqueous solution of polyvinyl phosphonic acid. The coating was dried for one minute at 80° C., exposed to light under a negative master and developed with an aqueous developer solution containing 4.0 percent of magnesium sulfate, 0.2 percent of an isooctyl phenyl polyethoxy ethanol having about 10 ethoxy units, 30 percent of n-propanol, and water. The plate then was run on a press to produce several thousand flawless copies. Coated plates could be stored for weeks prior to use. The length of run could be substantially increased by lacquering, e.g. with the lacquer described in U.S. Pat. No. 3,313,233, Example 1.

The diazo condensation product is prepared as follows: 32.3 parts by weight of 3-methoxy-diphenylamine-4-diazonium sulfate are dissolved in 120 parts by weight of 86 percent phosphoric acid. 12.9 parts by weight of 4,4'-bis-methoxy-methyl-diphenylether are slowly added, and condensation is effected for 21 hours at +40° C. The condensation mixture is dissolved in water, and the condensation product is then precipitated in the form of the chloride by adding 18 percent hydrochloric acid. The chloride is purified by dissolving it in water and reprecipitating it by means of hydrochloric acid. Finally, the condensate is dissolved again in water and precipitated from the solution in the form of the naphthalene-2-sulfonic acid salt. The precipitate is drawn off by suction, washed and dried. Yield: 35 parts by weight. (C, 67.0%; N, 7.2%; S, 5.6%; P, 0.18%; Cl, 0.21%; atomic ratio: C:N:S=32.6:3:1.)

The product is coupled in ethyleneglycol monomethylether and in the presence of ammonia with 1-phenyl-3-methyl-5-pyrazolone to yield the azo dyestuff. The average molecular weight of this dyestuff is 1,455 (vapor pressure osmometer, solvent: chloroform).

The dyestuff produced is subjected to a fractionating process. For this purpose, solutions of the dyestuff in chloroform are applied to aluminum foils and dried. The resulting thin dyestuff layers are than extracted by means of mixtures of a solvent (chloroform) and a nonsolvent (methanol), starting with mixtures of low solvent power and proceeding to mixtures with increasing solvent power.

The following table contains data on the particulars of the test and the mean molecular weights of the individual fractions:

| Fraction | Chloroform (ml.) | Methanol (ml.) | Quantity of fraction (mg.) | N, percent | Mean molecular weight |
|---|---|---|---|---|---|
| 1 | | 150 | 1.5 | | |
| 2 | 60 | 90 | 90.9 | 13.5 | 874 |
| 3 | 67.5 | 82.5 | 217.7 | 13.6 | 1,097 |
| 4 | 75 | 75 | 274.1 | 13.2 | 1,261 |
| 5 | 82.5 | 67.5 | 232.0 | 12.6 | 1,779 |
| 6 | 90 | 60 | 204.2 | 12.2 | 2,475 |
| 7 | 150 | | 143.3 | 11.5 | 3,995 |

EXAMPLE 2

0.3 part by weight of the diazo condensate used in Example 1 and 0.05 part by weight of phosphoric acid were dissolved in a mixture of 10 parts by volume of diacetone alcohol, 75 parts by volume of ethylene glycol monomethylether, and 15 parts by volume of butyl acetate. The coating was applied by dip-coating an aluminum sheet, the surface of which had been mechanically roughened and pretreated with an aqueous solution of polyvinyl phosphonic acid. The coating was dried for one minute at 80° C., exposed to light under a negative master and developed with the lacquer described in Example 2 of U.S. Pat. No. 3,313,233. The plate was run on a press to produce thousands of flawless copies. Coated plates were exceptionally stable to heat and prolonged storage. The ratio of phosphoric acid to the diazo condensate may be varied from 1:100 to 1:1, but preferably a ratio of 1 to 5 is employed for optimum performance.

EXAMPLE 3

0.5 part by weight of the diazo condensation product of Example 1, 0.08 part by weight of phosphoric acid and 1.5 parts by weight of a copolymer of styrene and maleic anhydride, average molecular weight about 20,000, acid number 180, were dissolved in 80 parts by volume of ethylene glycol monomethyl ether and 20 parts by volume of butyl acetate. The solution was coated onto an aluminum surface which had been mechanically roughened and pretreated with a solution of polyvinyl phosphonic acid. The coating was exposed to ultraviolet light under a negative master to yield a plate developable with acidic or alkaline solutions containing propyl alcohol in amounts of from 1 to 30 percent by volume. The plate was run on a press to produce thousands of copies.

EXAMPLE 4

A reaction mixture of 0.2 mole of 3-methoxy-diphenylamine-4-diazonium chloride and 0.1 mole of 4,4'-bis-methoxymethyl-diphenyl oxide dissolved in 1 mole of 92 percent phosphoric acid was condensed at 45° C. A 0.3 percent solution of the entire reaction mixture in a solvent mixture of 4 parts by volume of ethylene glycol monomethyl ether and 1 part by volume of butyl acetate was whirl-coated onto an aluminum support pretreated with polyvinyl phosphonic acid to give a high-quality offset printing plate. A plate exposed through a flat containing a $\sqrt{2}$ Stouffer Step Wedge for 20 units to a 95-ampere carbon arc at a distance of 50 inches produced a solid 4 and a ghost 10 when developed with a solution containing 2.5 parts by weight of sodium lauryl sulfate, 2.5 parts by weight of sodium sulfate, and 3 parts by weight of tartaric acid in 100 parts by volume of water, and rubbed down with the lacquer described in Example 1 of U.S. Pat. No. 3,313,233. With a 40-unit exposure, a solid 7 and a ghost 14 were obtained. This corresponds to a sensitivity twice that of a similar whirl-coated plate run as a control, containing the light sensitive compound described in Example 1 of U.S. Pat. No. 3,406,159, the molar ratio between diazo groups and phosphoric acid being 1:2.8. The quality of the image was excellent and fully equivalent to that of this standard plate. Even with the excess phosphoric acid, adhesion was very good and the image resisted prolonged rubbing with 5 percent phosphoric acid.

A yellow-green solid product was recovered from the reaction mixture when a portion of the reaction mixture was added slowly, with rapid stirring, to eight volumes of isopropanol per volume of reaction mixture and the tarry solid was washed repeatedly with isopropanol to remove occluded phosphoric acid.

1 part by weight of the reaction mixture, which consisted of a mixture of chloride and phosphate diazonium salts, was stirred together with 100 parts by volume of an ethylene glycol monomethyl ether:butyl acetate mixture in a 4:1 volume ratio and the supernatant liquid decanted;

the extraction was repeated twice, and the final residue, consisting largely of the phosphate salt, was dissolved completely in 100 parts by volume of deionized water. All solutions were whirl-coated on conditioned aluminum and the resulting plates exposed for 40 units, developed and rubbed down with the lacquer described in Example 1 of U.S. Pat. No. 3,313,233. The following results were obtained:

| | Solid | Ghost |
|---|---|---|
| 1st extraction | 7 | 14 |
| 2nd extraction | 8 | 16 |
| 3rd extraction | 7 | 15 |
| Water solution | 9 | 17 |

All plates gave images of good quality and resistance to hard rubbing with 5 percent phosphoric acid.

The diazonium salt in the solvent extracts undoubtedly contained a mixture of the chloride and phosphate salts but the diazonium salt in the aqueous solution was probably almost exclusively the phosphate salt.

EXAMPLE 5

A superficially saponified cellulose acetate film was coated by swabbing with a solution of the following composition:

1.0 part by weight of the diazo condensate described in Example 1, but precipitated in the form of the chloride (N 10 percent),
0.5 part by weight 93 percent phosphoric acid, and
50.0 parts by weight of water.

After image-wise exposure, the material was developed by wiping it over with water or with an aqueous solution of a salt of a water-soluble pyrazolone sulfonic acid, and then inked up with greasy ink. A printing plate was thus obtained which was very ink-receptive.

EXAMPLE 6

An electrolytically roughened aluminum foil which had been pretreated with polyvinyl phosphonic acid in accordance with the teaching of U.S. Pat. No. 3,220,832, was coated with a solution of the following composition and the coating was then dried:

1.0 part by weight of the diazo condensate described in Example 1, but separated in the form of the 2-diazo-1-naphthol-4-sulfonic acid salt (C, 62.1 percent; N, 10.8 percent),
0.1 part by weight of 4-diethylamino-azobenzene, and
50.0 parts by volume of a 8:2 mixture of ethylene glycol monomethyl ether and butyl acetate.

During image-wise exposure, a strong red image is produced which facilitates processing on a photocomposing machine. By development with the developer described in Example 4, an efficient offset printing plate is reduced.

EXAMPLE 7

A trimetal foil consisting of layers of aluminum, copper, and chromium was coated with the following solution and the coating was then dried:

1.0 part by weight of the diazo condensate used in Example 5 (chloride),
1.0 part by weight of a polyvinyl alcohol, a 4 percent aqueous solution of which has a viscosity of 6.5 to 8.8 cp., with a residual acetyl content of 12 percent, and
50.0 parts by volume of water.

After image-wise exposure under a positive original, the plate was developed by spraying with water.

Finally, the chromium is etched away down to the copper layer in the bared areas with an etching solution for chromium layers (20 percent of $CaCl_2$, 20 percent of $ZnCl_2$, and about 1.5 to 3 percent of $NH_4$ Cl, tartaric acid and concentrated hydrochloric acid). After decoating with a mixture of whiting and dimethyl formamide, a multimetal printing plate is obtained which is capable of very long runs.

EXAMPLE 8

A 4 percent solution of the diazo condensate described in Example 1, but separated as the salt of mesitylene sulfonic acid (C, 63.4 percent; N, 7.0 percent), in an 8:2 mixture of ethylene glycol monomethyl ether and butyl acetate is poured on a 1.5 mm. thick copper plate whose surface had been cleaned with whiting, and the coating thus produced is then dried. After image-wise exposure under a positive screen original, the plate is developed with the developer described in Example 4, and the bared areas are then etched away with a 40 percent solution of $FeCl_3$. After removal of the hardened reproduction layer, a positive halftone gravure plate is obtained.

EXAMPLE 9

The light-sensitive copper plate prepared in accordance with Example 8 is image-wise exposed under a negative screen original and then developed as described in Example 8. The copper is then etched away from the non-image areas so that these areas are recessed. A positive relief printing form is obtained.

EXAMPLE 10

An electrolytically roughened aluminum support is coated with the following solution and the coating is then dried:

1.0 part by weight of the diazo condensate described in Example 1, in the form of the bromide,
2.0 parts by weight of polyvinyl methyl acetamide (K value 90), and
0.2 part by weight of Crystal Violet (C.I. 42,555).

After image-wise exposure, the plate is rinsed with water so that the unexposed areas of the layer are washed away. A deep-blue colored tanned image is produced.

EXAMPLE 11

A blue tanned image is also obtained by repeating the procedure described in Example 10, replacing, however, the Crystal Violet by 5 parts by weight of powdered Heliogen Blue (C.I. 74,160) which had been very finely ground in a ball mill.

EXAMPLE 12

A mechanically roughened aluminum foil covered with a very thin, firmly adherent polyvinyl phosphonic acid layer is coated with a 0.5 percent solution of the diazo condensate described below, in ethylene glycol monomethyl ether, and the coating is then dried. A freshly coated plate as well as a plate which had been stored for 6 hours at 100° C. may be likewise processed, without difficulties, into a printing plate yielding long runs by image-wise exposure and wiping over with the developer described in Example 4. The length of run may be further increased by treatment with a conventional lacquer.

The mixed condensate is prepared as follows:

The second component used is a methoxymethyl diphenyl ether obtained by the reaction of commercial chloromethyl diphenyl ether (chlorine content 32 percent) with methanol and caustic soda solution.

According to the manufacturer's definition (cf. U.S. Pat. No. 3,316,186, column 3, lines 41 to 64), the chloro-metal printing plate is obtained which is capable of very Dow Chemical Co.) has a degree of $CH_2Cl$ substitution of 2.8 and consists of the following constituents:

| | Percent |
|---|---|
| 2,4'-bis-chloromethyl-diphenylether | 1.9 |
| 4,4'-bis-chloromethyl-diphenylether | 8.6 |
| 2,2',4'-tris-chloromethyl-diphenylether | 17.0 |
| 2,4,4'-tris-chloromethyl-diphenylether | 72.0 |
| 2,2',4,4'-tetrakis-chloromethyl-diphenylether | <2 |

The ether mixture obtained by replacing the halogen atoms by methoxy groups has a $CH_3O$ content of 28.9 percent. Condensation is performed in a similar manner as in Example 1. Details are given in the following table:

3 - methoxy-diphenylamine - 4 - diazonium sulfate, 32.3 parts by weight
86 percent phosphoric acid, 120.0 parts by weight
Methoxy-methyl-diphenyl ether (see above), 10.7 parts by weight
Condensation time, 20 hours at 40° C.
Separation as the chloride, 2 times with HCl
Finally separated as naphthalene-2-sulfonate
Yield, 6.4 parts by weight

*Analysis.*—C, 65.2 percent; N, 7.2 percent; S, 6.1 percent; $OCH_3$, 6.4 percent; atomic ratio:

C:N:S=31.8:3:1.1

EXAMPLE 13

0.3 part by weight of the diazo condensation product described in Example 1 and 0.6 part by weight of polyvinyl formal having a molecular weight range of 26,000 to 34,000 and containing 5.5 to 7 percent of vinyl alcohol units, 22 to 30 percent of vinyl acetate units, and 50 percent of vinyl formal units were dissolved in a mixture of 50 parts by volume of diacetone alcohol, 20 parts by volume of ethylene glycol monomethyl ether acetate, and 30 parts by volume of methyl ethyl ketone. The coating was applied by whirl-coating an aluminum sheet, the surface of which had been mechanically roughened and pretreated with an aqueous solution of polyvinyl phosphonic acid. The coating was dried for one minute at 80° C., exposed to light under a negative master and developed with a solution containing 4 parts by weight of monosodium phosphate, 70 parts by volume of water and 30 parts by volume of propyl alcohol. The plate was run on the press to produce 25,000 flawless copies. The plate can be lacquered to yield even longer runs if desired.

EXAMPLE 14

0.3 part by weight of the diazo condensation product described in Example 1, 1.2 part by weight of the polyvinyl formal used in Example 13, 0.10 part by weight of Orasol Black B (Ciba), and 0.03 part by weight of p-phenyl azo diphenylamine were dissolved in 50 parts by volume of diacetone alcohol, 20 parts by volume of ethylene glycol monomethyl ether acetate, 28 parts by volume of methyl ethyl ketone, and 2 parts by volume of water. The solution was whirl-coated onto an aluminum surface which had been mechanically roughened and pretreated with an aqueous solution of polyvinyl phosphonic acid. The coating was dried for one minute at 80° C. exposed for 2 to 5 minutes to ultraviolet light from a 95 amp. arc at 50 inches under a negative master. After exposure the image turned violet and provided a contrasting print against the green background of the plate. The plate was developed with an aqueous developer containing 30 parts by volume of n-propyl alcohol and 70 parts by volume of water. The resulting plate yielded an image suitable for examination of the finest half tones. The plate was run on the press to produce thousands of flawless copies.

EXAMPLE 15

0.3 part by weight of the diazo condensation product described in Example 1, 0.05 part by weight of phosphoric acid, and 1.5 parts by weight of the polyvinyl formal described in Example 13 were dissolved in 60 parts by volume of diacetone alcohol, 20 parts by volume of ethylene glycol monomethyl ether acetate, and 20 parts by volume of methyl ethyl ketone. The solution was whirl-coated onto an aluminum surface pretreated to form a layer of tightly bonded polyvinyl phosphonic acid. After exposing the plate to ultraviolet light under a negative master and developing the plate with a solution consisting of 30 parts by volume of n-propyl alcohol and 70 parts by volume of water the plate was run on the press to produce thousands of flawless copies.

It will be obvious to those skilled in the art that many modifications may be made within the scope of the present invention without departing from the spirit thereof, and the invention includes all such modifications.

What is claimed is:

1. Light-sensitive reproduction material comprising a support and a reproduction layer thereon which latter contains a light-sensitive condensation product of at least one diazonium salt of the general formula

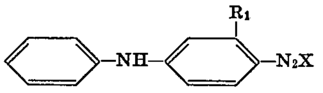

wherein $R_1$ is selected from the group consisting of H, an alkoxy group having from 1 to 4 carbon atoms, and a 2-hydroxy-ethoxy group, and X is the anion of the diazonium salt, and at least one compound of the general formula $$R(\text{—}CH_2\text{—}OR_2)_n$$

wherein

*n* is an integer from 1 to 4,

R is a residue produced by the splitting off of *n* hydrogen atoms from a diphenyl ether, and $R_2$ is an alkyl group with 1 to 4 carbon atoms, said condensation product containing, on the average, 0.25 to 0.75 unit derived from $R(\text{—}CH_2\text{—}OR_2)_n$ per diazo group.

2. Light-sensitive reproduction material according to claim 1 which contains, as the light-sensitive substance, a condensation product of 3-methoxy-diphenylamine-4-diazonium hydrogensulfate and 4,4'-bis-methoxymethyl-diphenylether, separated in the form of the naphthalene-2-sulfonate salt.

3. Light-sensitive reproduction material according to claim 2, in which the condensation product has been prepared from 2 molar parts of the diphenylamine diazonium salt and 1 molar part of the methoxy-methyl-diphenylether.

4. A light-sensitive condensation product of at least one diazonium salt of the general formula

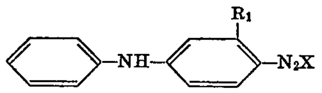

wherein $R_1$ is selected from the group consisting of H, an alkoxy groups having from 1 to 4 carbon atoms, and a 2-hydroxy-ethoxy group, and X is the anion of the diazonium salt, and at least one compound of the general formula $$R(\text{—}CH_2\text{—}OR_2)_n$$

wherein $n$ is an integer from 1 to 4,

R is a residue produced by the splitting off of $n$ hydrogen atoms from a diphenyl ether, and $R_2$ is an alkyl group with 1 to 4 carbon atoms, said condensation product containing, on the average, 0.25 to 0.75 unit derived from $R(-CH_2-OR_2)_n$ per diazo group.

References Cited

UNITED STATES PATENTS

| | | | |
|---|---|---|---|
| 3,235,383 | 2/1966 | Steppan et al. | 96—75 X |
| 3,236,646 | 2/1966 | Steppan et al. | 96—75 X |
| 3,246,986 | 4/1966 | Borchers | 96—75 X |
| 3,300,309 | 1/1967 | Chu | 96—75 |
| 3,503,330 | 3/1970 | Chu | 96—75 X |
| 3,510,307 | 5/1970 | Borchers et al. | 96—75 |
| 2,063,631 | 12/1936 | Schmidt et al. | 96—91 X |
| 2,498,722 | 2/1950 | Straley | 260—141 X |
| 2,541,727 | 2/1951 | Von Glahn et al. | 96—91 |
| 2,593,839 | 4/1952 | Buc | 96—91 X |
| 2,593,911 | 4/1952 | Neumann et al. | 96—91 |
| 2,649,373 | 8/1953 | Neugebauer et al. | 96—75 X |
| 2,679,498 | 5/1954 | Seven et al. | 96—91 X |
| 3,155,512 | 11/1964 | De Boer | 260—141 X |
| 3,220,832 | 11/1965 | Uhlig | 96—75 X |
| 3,235,382 | 2/1966 | Neugebauer et al. | 96—75 X |
| 2,717,832 | 9/1955 | Sulich | 96—91 |

FOREIGN PATENTS

| | | | |
|---|---|---|---|
| 941,835 | 11/1963 | Great Britain | 96—91 |

OTHER REFERENCES

Kosar, J.: "Light-Sensitive Systems," 1965, pp. 322–324.

CHARLES L. BOWERS, Jr., Primary Examiner

U.S. Cl. X.R.

96—33, 36, 36.3, 75; 260—141, 142

UNITED STATES PATENT OFFICE
CERTIFICATE OF CORRECTION

Patent No. 3,679,419 Dated July 25, 1972

Inventor(s) Thomas N. Gillich

It is certified that error appears in the above-identified patent and that said Letters Patent are hereby corrected as shown below:

Column 2, line 6, "a" should read --- of ---.

Column 4, line 19, "and" should read --- an ---.

Column 4, line 71, "home" should read --- homo ---.

Column 11, line 60, "reduced" should read --- produced ---.

Column 12, line 75, delete this line and substitute --- methylated diphenyl ether (CMDPO 32, manufactured by ---.

Column 14, line 71, "groups" should read --- group --- .

Signed and sealed this 5th day of December 1972.

(SEAL)
Attest:

EDWARD M.FLETCHER,JR.
Attesting Officer

ROBERT GOTTSCHALK
Commissioner of Patents